United States Patent
Liu

(10) Patent No.: US 9,164,989 B2
(45) Date of Patent: Oct. 20, 2015

(54) TRANSLATION PROCESSING DEVICE, NON-TRANSITORY COMPUTER READABLE MEDIUM, AND TRANSLATION PROCESSING METHOD

(71) Applicant: FUJI XEROX CO., LTD., Minato-ku, Tokyo (JP)

(72) Inventor: Shaoming Liu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/678,544

(22) Filed: Apr. 3, 2015

(65) Prior Publication Data
US 2015/0213007 A1      Jul. 30, 2015

Related U.S. Application Data

(63) Continuation of application No. PCT/JP2013/066640, filed on Jun. 18, 2013.

(30) Foreign Application Priority Data

Oct. 5, 2012   (JP) .................................. 2012-222914

(51) Int. Cl.
*G06F 17/28*      (2006.01)
(52) U.S. Cl.
CPC ..................................... *G06F 17/289* (2013.01)
(58) Field of Classification Search
CPC . G06F 17/289; G06F 17/2836; G06F 17/211; G06F 17/2795; G06F 17/3061; G06F 9/4448; G09B 19/06
USPC ................ 704/2, 9, 7, 4, 3; 715/259
See application file for complete search history.

(56) References Cited

U.S. PATENT DOCUMENTS

| 4,730,270 A  * | 3/1988  | Okajima et al. ................... 704/2 |
| 6,330,529 B1 * | 12/2001 | Ito ..................................... 704/3 |
| 6,735,559 B1 * | 5/2004  | Takazawa ......................... 704/7 |

(Continued)

FOREIGN PATENT DOCUMENTS

| JP | 6-325080 A  | 11/1994 |
| JP | 10-222516 A | 8/1998  |

(Continued)

OTHER PUBLICATIONS

International Search Report of PCT/JP2013/066640, dated Aug. 6, 2013. [PCT/ISA/210].

*Primary Examiner* — Michael Colucci
(74) *Attorney, Agent, or Firm* — Sughrue Mion, PLLC

(57) ABSTRACT

A translation processing device includes a setting unit classifying languages into categories and setting a typical language for each category, a first converter converting between a sentence in a first language and a sentence in a first typical language, a second converter converting between a sentence in the first typical language and a sentence in a second typical language, and an acquiring unit acquiring information of an input sentence, the first language, and a second language. If the first language is not the first typical language, the first converter converts the input sentence into a sentence in the first typical language. If the first and second languages belong to different categories, the second converter converts the sentence into a sentence in the second typical language. If the second language is not the second typical language, the first converter further converts the sentence into a sentence in the second language.

4 Claims, 6 Drawing Sheets

(56) References Cited

U.S. PATENT DOCUMENTS

| | | | |
|---|---|---|---|
| 7,401,016 B2 | 7/2008 | Masuichi et al. | |
| 9,031,829 B2* | 5/2015 | Leydon et al. | 704/2 |
| 2002/0007382 A1* | 1/2002 | Nojima et al. | 707/532 |
| 2003/0176995 A1* | 9/2003 | Sukehiro | 704/2 |
| 2003/0208352 A1* | 11/2003 | Lee | 704/2 |
| 2004/0078193 A1* | 4/2004 | Masuichi et al. | 704/9 |
| 2006/0217963 A1* | 9/2006 | Masuichi et al. | 704/7 |
| 2006/0241934 A1* | 10/2006 | Izuha | 704/2 |
| 2009/0030671 A1* | 1/2009 | Kwon et al. | 704/2 |
| 2009/0106018 A1* | 4/2009 | Liu | 704/4 |
| 2009/0182770 A1* | 7/2009 | Madhavan | 707/103 R |
| 2010/0138213 A1* | 6/2010 | Bicici et al. | 704/4 |
| 2011/0046940 A1* | 2/2011 | Tanaka et al. | 704/2 |
| 2011/0087481 A1* | 4/2011 | Yang et al. | 704/3 |
| 2011/0202334 A1* | 8/2011 | Abir | 704/4 |
| 2011/0307240 A1* | 12/2011 | Kogan et al. | 704/2 |
| 2012/0296630 A1* | 11/2012 | Ghassemi et al. | 704/3 |
| 2013/0060559 A1* | 3/2013 | Ryu et al. | 704/3 |
| 2013/0124185 A1* | 5/2013 | Sarr et al. | 704/2 |
| 2014/0156258 A1* | 6/2014 | Suzuki | 704/3 |

FOREIGN PATENT DOCUMENTS

| | | |
|---|---|---|
| JP | 2001-92822 A | 4/2001 |
| JP | 2004-139427 A | 5/2004 |
| JP | 2006-146732 A | 6/2006 |
| JP | 2009-230561 A | 10/2009 |
| JP | 2011-8553 A | 1/2011 |
| JP | 2011-197713 A | 10/2011 |
| JP | 2012-48418 A | 3/2012 |
| JP | 4911028 B2 | 4/2012 |
| WO | 2006/090732 A1 | 8/2006 |

* cited by examiner

FIG. 5

| LANGUAGE ID | CATEGORY | TYPICAL LANGUAGE FLAG |
|---|---|---|
| $L_{10}$ | C1 | T |
| $L_{11}$ | C1 | F |
| $L_{12}$ | C1 | F |
| ⋮ | ⋮ | ⋮ |
| $L_{20}$ | C2 | T |
| | | |

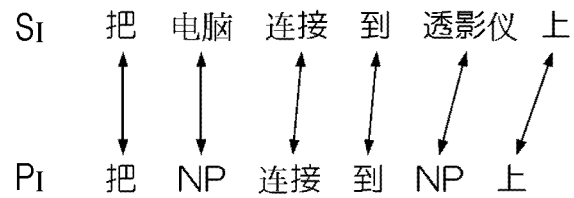
FIG. 6A
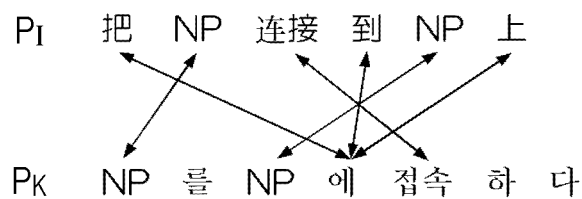
FIG. 6B
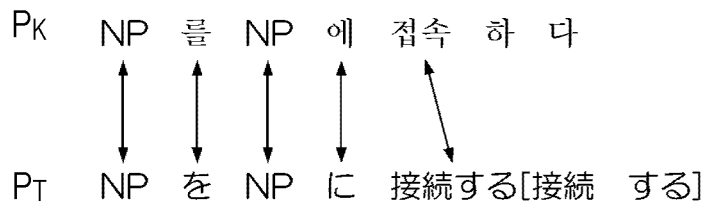
FIG. 6C
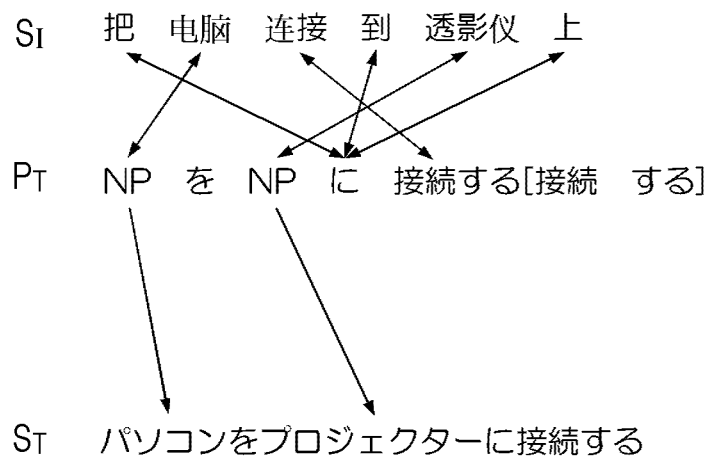
FIG. 6D
FIG. 6E

TRANSLATION PROCESSING DEVICE, NON-TRANSITORY COMPUTER READABLE MEDIUM, AND TRANSLATION PROCESSING METHOD

CROSS-REFERENCE TO RELATED APPLICATIONS

This application is based on and claims priority under 35 USC 119 from PCT International Application No. PCT/JP2013/066640 filed Jun. 18, 2013.

BACKGROUND

Technical Field

The present invention relates to a translation processing device, a non-transitory computer readable medium, and a translation processing method.

SUMMARY

According to an aspect of the invention, there is provided a translation processing device including a setting unit, an intra-category converting unit, an inter-category converting unit, and an acquiring unit. The setting unit classifies plural languages into a number of language categories and sets a typical language for each of the language categories. The intra-category converting unit performs, for each of the language categories, mutual conversion between a sentence described in a first language classified in a first language category and a sentence described in a first typical language of the first language category. The inter-category converting unit performs mutual conversion between a sentence described in the first typical language and a sentence described in a second typical language. The acquiring unit acquires information of an input sentence, the first language corresponding to a language of the input sentence, and a second language corresponding to a language into which the input sentence is translated. If the first language is not the first typical language, the intra-category converting unit converts the input sentence into a sentence described in the first typical language of the first language category to which the first language belongs. If the first language and the second language belong to different language categories, the inter-category converting unit converts the sentence converted by the intra-category converting unit into a sentence described in the second typical language of a second language category to which the second language belongs. If the second language is not the second typical language, the intra-category converting unit further converts the sentence converted by the inter-category converting unit into a sentence described in the second language.

BRIEF DESCRIPTION OF THE DRAWINGS

An exemplary embodiment of the present invention will be described in detail based on the following figures, wherein:

FIG. 5 is a diagram illustrating an example of a category information table; and FIGS. 6A, 6B, 6C, 6D and 6E are diagrams illustrating a specific example of the translation process.

DETAILED DESCRIPTION

An exemplary embodiment for implementing the present invention (hereinafter referred to as the exemplary embodiment) will be described below in accordance with the drawings.

Description of Functional Blocks

Figure 1:
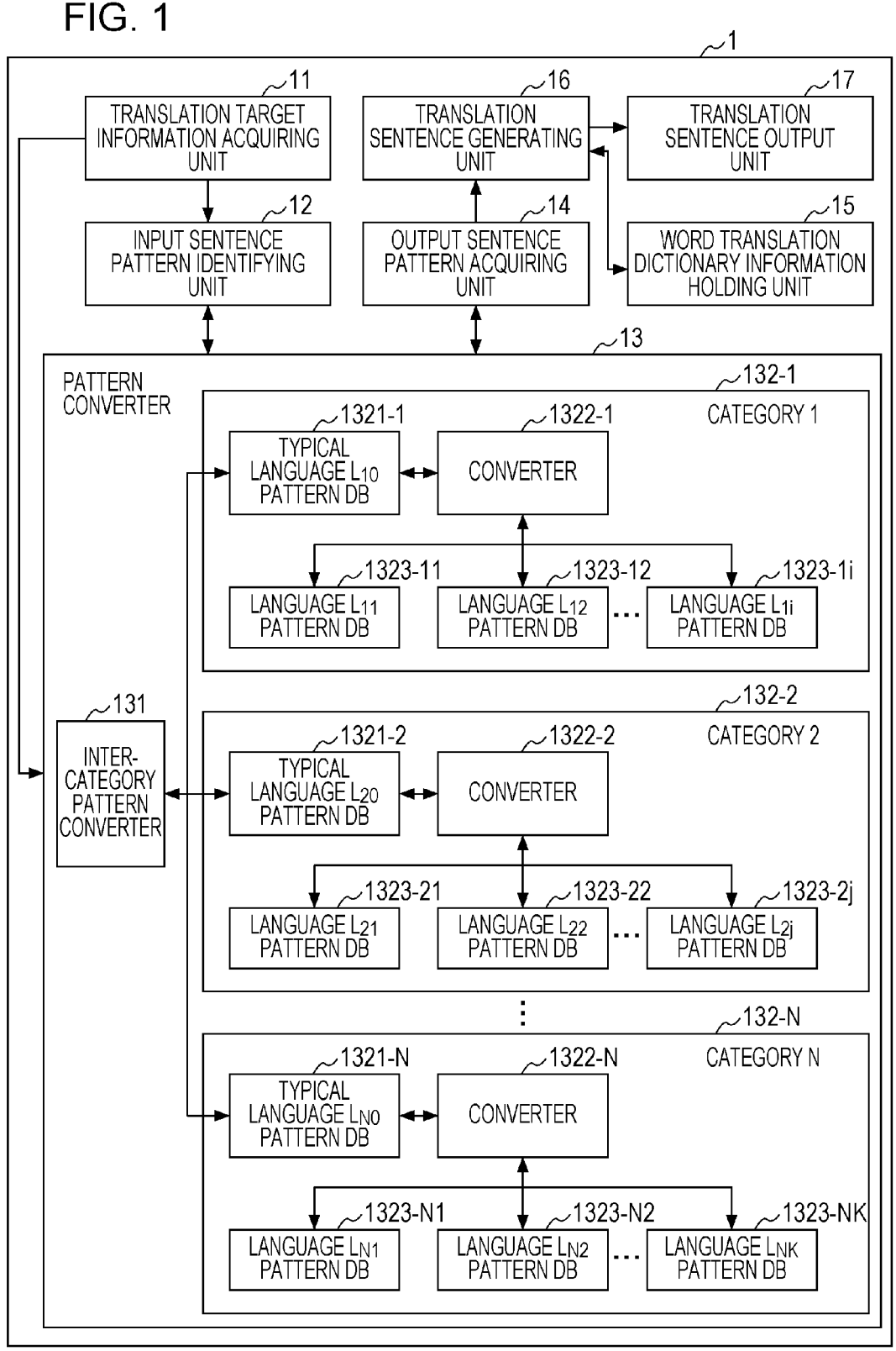
FIG. 1 is a functional block diagram of a translation processing device according to the present exemplary embodiment.

FIG. 1 illustrates a functional block diagram of a translation processing device 1 according to the present exemplary embodiment. As illustrated in FIG. 1, the translation processing device 1 includes a translation target information acquiring unit 11, an input sentence pattern identifying unit 12, a pattern converter 13, an output sentence pattern acquiring unit 14, a word translation dictionary information holding unit 15, a translation sentence generating unit 16, and a translation sentence output unit 17.

The functions of the above-described units included in the translation processing device 1 may be realized as a computer, which includes a controller such as a central processing unit (CPU), a storage unit such as a memory, an input-output unit that transmits and receives data to and from an external device, and so forth, reads and executes a program stored in a computer readable information storage medium. The program may be supplied to the translation processing device 1 serving as a computer by an information storage medium such as an optical disk, a magnetic disk, a magnetic tape, a magneto-optical disk, or a flash memory, or via a data communication network such as the Internet.

The translation target information acquiring unit 11 acquires the information of an input sentence to be subjected to a translation process, the language of the input sentence (original language), and the language obtained after the translation (target language) (translation target information). For example, the translation target information acquiring unit 11 may acquire the translation target information based on an input by a user from an input device connected to the translation processing device 1 or based on data received from another device.

The input sentence pattern identifying unit 12 identifies a translation pattern corresponding to the input sentence acquired by the translation target information acquiring unit 11. The translation pattern corresponds to information configuring a sentence divided into a variable portion and a fixed portion. For example, the variable portion is expressed by data such as type information, variable information, positional information, and lexical system information. The type information stores a truth value specifying the variable portion (1) or the fixed portion (0). The variable information stores data specifying NP (1: noun phrase), AP (2: adjective phrase), DP (3: adverb phrase), MP (4: quantifier phrase), SP (5: place-name phrase), TP (6: time phrase), VP (7: verb phrase), PP (8: postpositional particle phrase), or the like. The positional information stores information indicating the position of the variable portion in an example sentence pattern (information indicating how many elements from the head precede the variable portion). The lexical system information stores language information such as Japanese (J) or Chinese (C). Further, the fixed portion is expressed by data such as type information, fixed contents, positional information, and lexical system information. The fixed contents store text data of a word, a phrase, or the like configuring the fixed portion of the example sentence pattern.

Description will be given below of a specific example of the processing performed by the input sentence pattern identifying unit 12.

The translation processing device 1 according to the present exemplary embodiment holds a database of translation patterns (pattern DB) for each of languages. The input sentence pattern identifying unit 12 extracts from the pattern DB of the original language a candidate group of translation patterns corresponding to the input sentence. For example, translation patterns having a degree of similarity to the input sentence and a rate of covering the input sentence equal to or greater than respective thresholds may be extracted as the candidate group. Herein, if the input sentence and a pattern are represented as S and A, respectively, the degree of similarity Sim(S,A) and the rate of coverage Cov(S,A) between S and A are calculated with the following formulae.

[Math. 1]
$$Sim(S, A) = \frac{2*|S \cap A|}{|S| + |A|} \quad (1)$$

[Math. 2]
$$Cov(S, A) = \frac{|S \cap A|}{|S|} \quad (2)$$

The input sentence pattern identifying unit 12 may calculate respective distances between the input sentence and the above-extracted patterns of the candidate group and identify the pattern having the shortest one of the calculated distances as the input sentence pattern. The distance between the pattern and the sentence may be calculated based on the result of comparison of respective components.

Further, other than the above-described process, the input sentence pattern identifying unit 12 may extract a candidate group of similar patterns based on the distances between the patterns and the input sentence (extract patterns having a distance equal to or shorter than a threshold, for example), calculate mappings (correspondence relationships) between the input sentence and the respective extracted patterns of the candidate group, and identify the pattern corresponding to the optimal one of the calculated mappings as the input sentence pattern.

The pattern converter 13 converts the input sentence pattern identified by the input sentence pattern identifying unit 12 into a pattern of the target language (output sentence pattern). Description will be given below of a configuration of the pattern converter 13 and details of processing in the pattern converter 13.

The pattern converter 13 includes an inter-category pattern converter 131 and a number of intra-category pattern converters 132 (132-1 to 132-N). In the present exemplary embodiment, plural languages are divided into a number (1 to N: N represents an integer equal to or greater than 2) of categories (classes), and the inter-category pattern converter 131 and the intra-category pattern converters 132 execute pattern conversion between different categories and pattern conversion in the same category, respectively.

Each of the categories includes a number of languages, one of which is set as a typical language. The typical language for each of the categories may be set by the user, or may be set at random to an arbitrary one of the languages included in the category. The intra-category converters 132-1 to 132-N, typical language pattern DBs 1321-1 to 1321-N, converters 1322-1 to 1322-N, and language pattern DBs 1323-11, 1323-12, . . . in FIG. 1 will hereinafter be described as the intra-category pattern converters 132, the typical language pattern DBs 1321, the converters 1322, and the language pattern DBs 1323 for ease of description.

The intra-category pattern converter 132 is provided for each of the categories, and includes the typical language pattern DB 1321, the language pattern DBs 1323, and the converter 1322. Language Lxy (x represents an integer equal to or greater than 1, and y represents an integer equal to or greater than 0) in FIG. 1 indicates that the language Lxy is the y-th language in category x. It is indicated herein that, when y=0, that is, Lx0 is the typical language in category x.

The typical language pattern DB 1321 stores the information of patterns of a typical language.

The language pattern DB 1323 stores the information of patterns of a language.

The converter 1322 converts the pattern of a language in the same category into the pattern of another language in the same category based on correspondence relationship information representing the correspondence relationship between the patterns stored in the typical language pattern DB 1321 and the patterns stored in the respective language pattern DBs 1323. Herein, the information of the correspondence relationship between patterns of the languages other than the typical language is not held. That is, between the typical language and a language other than the typical language, the converter 1322 directly converts the pattern based on the correspondence relationship information. Between two languages other than the typical language, the converter 1322 converts the pattern of one of the languages into the pattern of the typical language, and thereafter converts the converted pattern of the typical language into the pattern of the target language.

The inter-category pattern converter 131 converts the pattern of the typical language in the first category into the pattern of the typical language in the second category based on correspondence relationship information representing the correspondence relationship between the patterns stored in the typical language pattern DB 1321 of the first category and the patterns stored in the typical language pattern DB 1321 of the second category.

If the original language and the target language belong to the same category, the pattern converter 13 causes the intra-category pattern converter 132 in the category to convert the input sentence pattern into the pattern of the target language. Further, if the original language and the target language belong to different categories, the pattern converter 13 converts the input sentence pattern into the pattern of the typical language in the category to which the original language belongs (first typical language pattern), thereafter further converts the first typical language pattern into the pattern of the typical language in the category to which the target language belongs (second typical language pattern), and converts the second typical language pattern into the pattern of the target language. If the original language and the target language are typical languages in the above-described process, the conversion into the typical language pattern is unnecessary.

The output sentence pattern acquiring unit 14 acquires the pattern of the target language obtained through the conversion of the input sentence pattern by the pattern converter 13 as the output sentence pattern corresponding to the input sentence.

The word translation dictionary information holding unit 15 holds dictionary information representing the correspondence relationship of words (which may include phrases) between languages. The word translation dictionary information holding unit 15 may hold the dictionary information between arbitrary languages in all categories, or may hold the dictionary information between arbitrary typical languages and the dictionary information between the typical language and an arbitrary language other than the typical language in the same category.

The translation sentence generating unit 16 generates a translation sentence based on the output sentence pattern acquired by the output sentence pattern acquiring unit 14, the input sentence, and the dictionary information between the original language and the target language. Specifically, the translation sentence generating unit 16 generates the translation sentence by translating a word (phrase) of the input sentence corresponding to a variable portion (noun phrase: NP, for example) of the output sentence pattern based on the dictionary information between the original language and the target language and substituting the translated word for the variable portion of the output sentence pattern.

The translation sentence output unit 17 outputs the translation sentence generated by the translation sentence generating unit 16. For example, the translation sentence output unit 17 may display the translation sentence on a display device, or may print out the translation sentence.

Description of Flow

With reference to the flowcharts illustrated in FIGS. 2 to 4, description will now be given of a flow of the translation process performed by the translation processing device 1.

Figure 2:
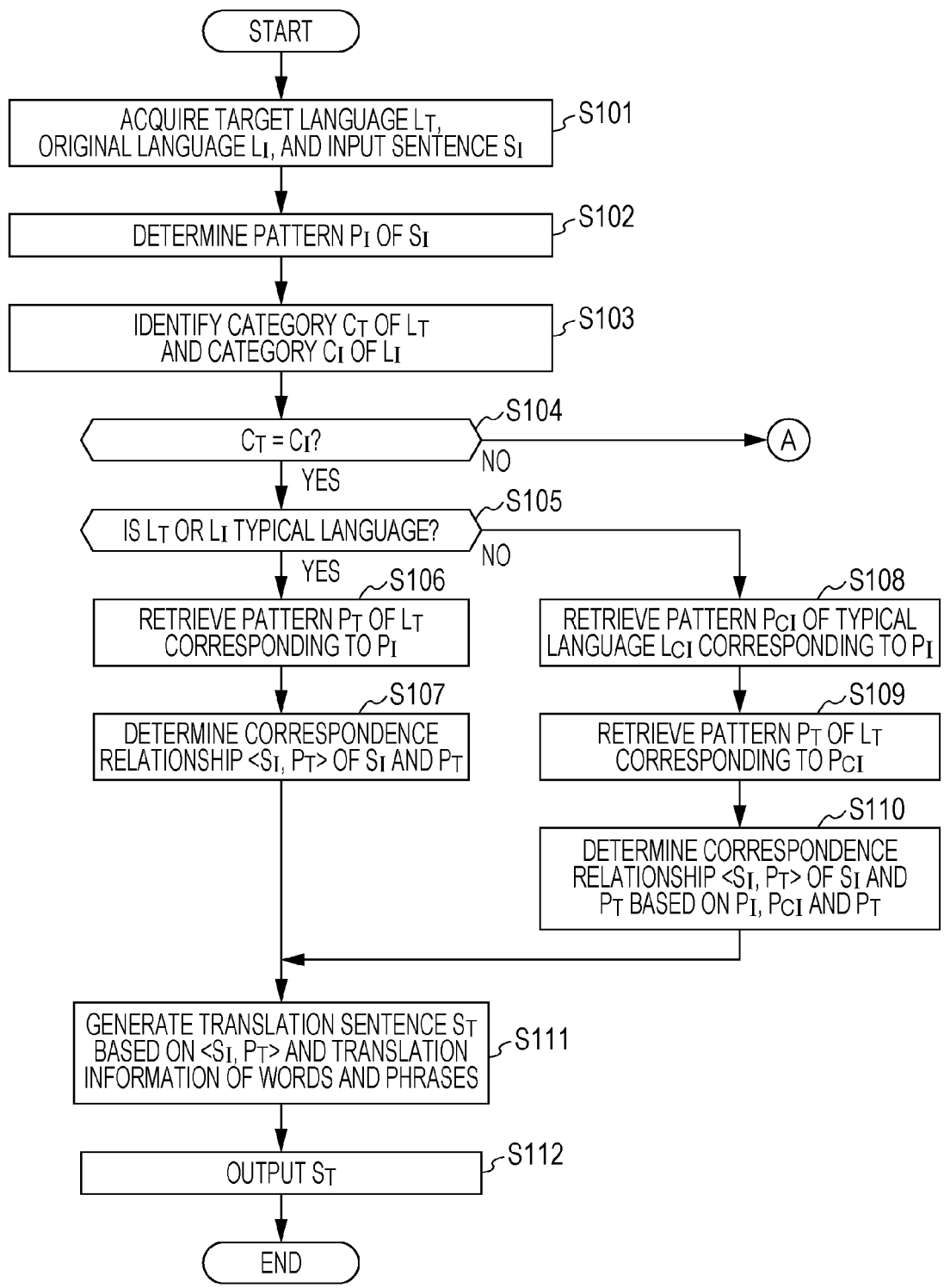
FIG. 2 is a flowchart of a translation process.

As illustrated in FIG. 2, the translation processing device 1 acquires the information of an original language LI, an input sentence SI, and a target language LT into which the input sentence SI is translated (step S101).

The translation processing device 1 determines an input sentence pattern PI corresponding to the input sentence SI out of the patterns stored in the language pattern DB 1323 of the original language LI (step S102).

The translation processing device 1 then identifies a target language category CT of the target language LT and an original language category CI of the original language LI (step S103). Category information of each of the languages may be identified based on a category information table illustrated in FIG. 5. As illustrated in FIG. 5, identification information of the language (language ID), the category to which the language belongs, and a typical language flag are stored in association with one another in the category information table. It is indicated herein that a language with the typical language flag set to T (true) is the typical language of the category to which the language belongs.

If the target language category CT of the target language LT and the original language category CI of the original language LI match (YES at step S104), the translation processing device 1 proceeds to step S105.

If the target language LT or the original language LI is the typical language (YES at step S105), the translation processing device 1 retrieves an output sentence pattern PT of the target language LT corresponding to the input sentence pattern PI based on the correspondence relationship information between the language patterns of the original language category CI (step S106). Herein, the translation processing device 1 determines a correspondence relationship <SI,PT> between the input sentence SI and the output sentence pattern PT from a correspondence relationship <SI,PI> between the input sentence SI and the input sentence pattern PI and a correspondence relationship <PI,PT> between PI and PT (step S107).

If the target language LT or the original language LI is not the typical language at step S105 (NO at step S105), the translation processing device 1 retrieves a pattern PCI of the typical language corresponding to the input sentence pattern PI (that is, a typical language LCI of the original language category CI) based on the correspondence relationship information between the language patterns of the original language category CI (step S108).

The translation processing device 1 then retrieves the output sentence pattern PT of the target language LT corresponding to the pattern PCI based on the correspondence relationship information between the language patterns of the original language category CI (step S109). Herein, the translation processing device 1 determines the correspondence relationship <SI,PT> between the input sentence SI and the output sentence pattern PT from the correspondence relationship <SI,PI> between the input sentence SI and the input sentence pattern PI, a correspondence relationship <PI,PCI> between PI and PCI, and a correspondence relationship <PCI,PT> between PCI and PT (step S110).

After step S107 or S110, the translation processing device 1 generates a translation sentence ST based on the correspondence relationship <SI,PT> between the input sentence SI and the output sentence pattern PT and translation information of words and phrases of the original language LI and the target language LT (step S111), outputs the generated translation sentence ST (step S112), and completes the process.

Figure 3:
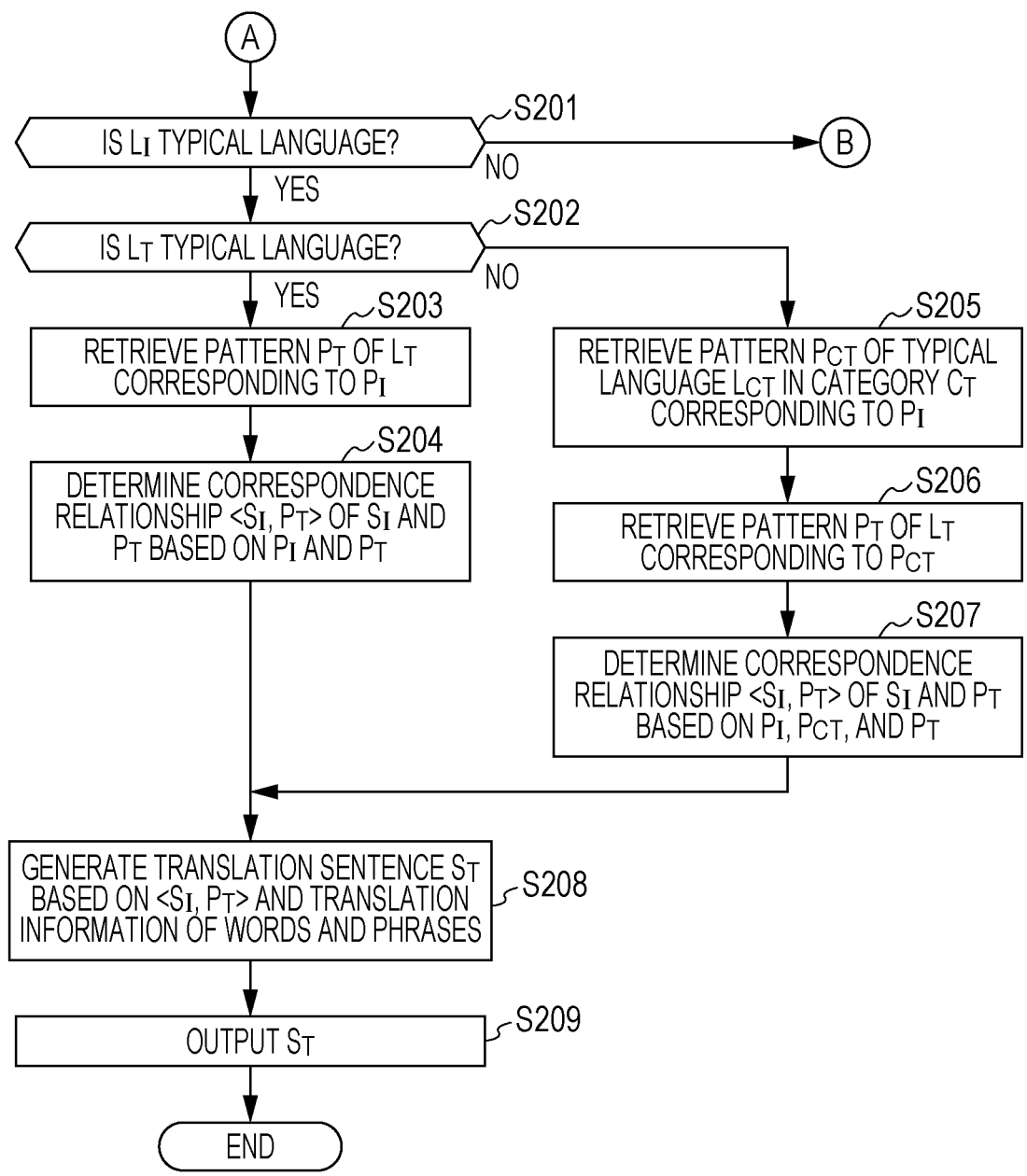
FIG. 3 is a flowchart of the translation process.

Further, if the target language category CT of the target language LT and the original language category CI of the original language LI do not match at step S104 (NO at step S104), the translation processing device 1 proceeds to step S201 in FIG. 3.

The flow in FIG. 3 will now be described.

As illustrated in FIG. 3, after NO at step S104 in FIG. 2, if the original language LI is the typical language (YES at step S201), the translation processing device 1 proceeds to step S202.

If the target language LT is the typical language (YES at step S202), the translation processing device 1 retrieves the output sentence pattern PT of the target language LT corresponding to the input sentence pattern PI based on the correspondence relationship information between the patterns of the typical languages (step S203). Herein, the translation processing device 1 determines the correspondence relationship <SI,PT> between the input sentence SI and the output sentence pattern PT from the correspondence relationship <SI,PI> between the input sentence SI and the input sentence pattern PI and the correspondence relationship <PI,PT> between PI and PT (step S204).

Further, if the target language LT is not the typical language at step S202 (NO at step S202), the translation processing device 1 retrieves a pattern PCT of a typical language LCT of the target language category CT corresponding to the input sentence pattern PI based on the correspondence relationship information between the patterns of the typical languages (step S205).

Then, the translation processing device 1 retrieves the output sentence pattern PT of the target language LT corresponding to the pattern PCT based on the correspondence relationship information between the language patterns of the target language category CT (step S206). Herein, the translation processing device 1 determines the correspondence relationship <SI,PT> between the input sentence SI and the output sentence pattern PT from the correspondence relationship <SI,PI> between the input sentence SI and the input sentence pattern PI, a correspondence relationship <PI,PCT> between PI and PCT, and a correspondence relationship <PCT,PT> between PCT and PT (step S207).

After step S204 or S207, the translation processing device 1 generates the translation sentence ST based on the correspondence relationship <SI,PT> between the input sentence SI and the output sentence pattern PT and the translation information of words and phrases of the original language LI and the target language LT (step S208), outputs the generated translation sentence ST (step S209), and completes the process.

Figure 4:
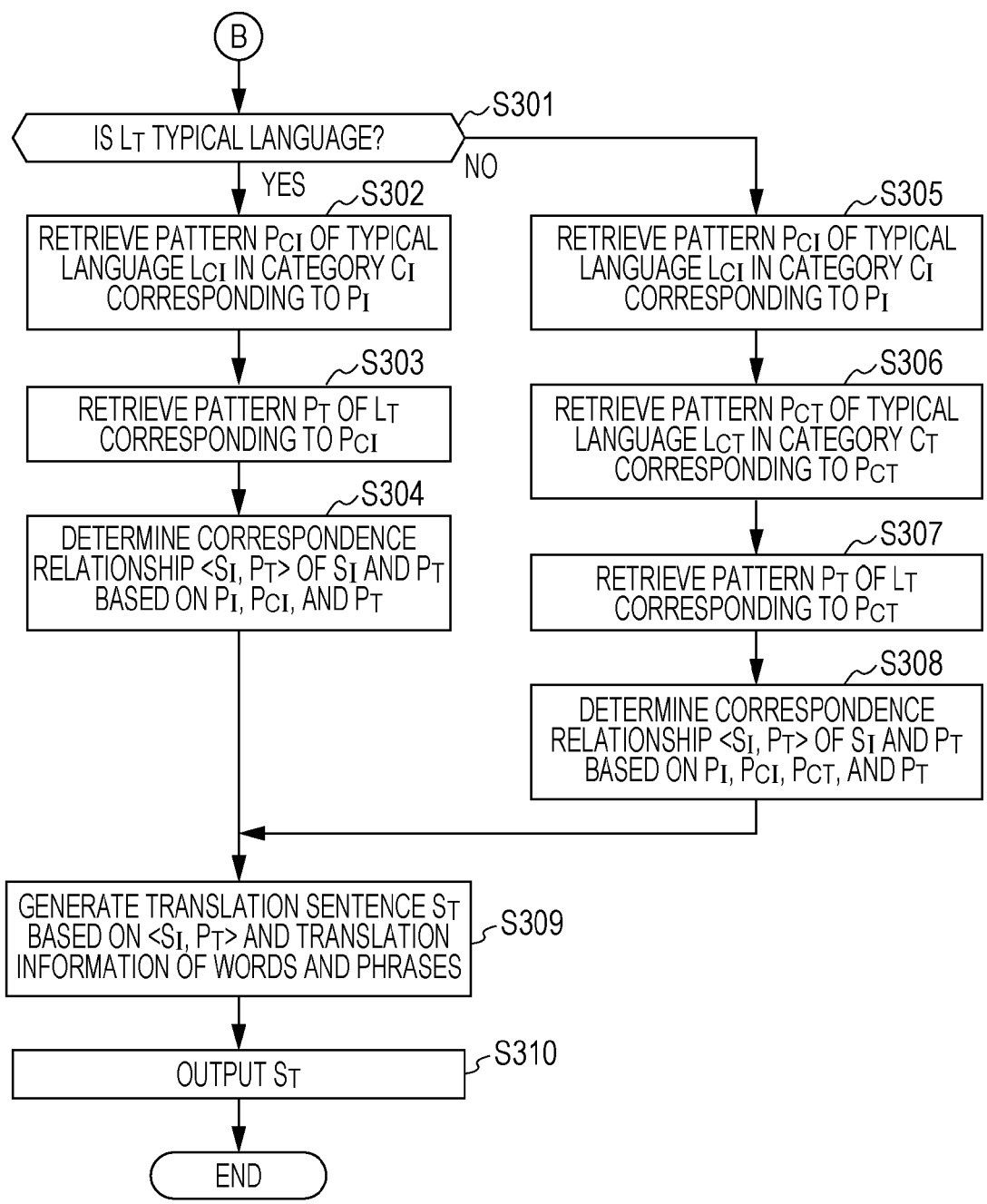
FIG. 4 is a flowchart of the translation process.

Further, if the original language LI is not the typical language at step S201 (NO at step S201), the translation processing device 1 proceeds to step S301 in FIG. 4.

The flow in FIG. 4 will now be described.

As illustrated in FIG. 4, after NO at step S201 in FIG. 3, if the target language LT is the typical language (YES at step S301), the translation processing device 1 retrieves the pattern PCI of the typical language LCI of the original language category CI corresponding to the input sentence pattern PI based on the correspondence relationship information between the patterns of the typical languages (step S302).

Further, the translation processing device 1 retrieves the output sentence pattern PT of the target language LT corresponding to the pattern PCI based on the correspondence relationship information between the language patterns of the target language category CT (step S303). The translation processing device 1 then determines the correspondence relationship <SI,PT> between the input sentence SI and the output sentence pattern PT from the correspondence relationship <SI,PI> between the input sentence SI and the input sentence pattern PI, the correspondence relationship <PI,PCI> between PI and PCI, and the correspondence relationship <PCI,PT> between PCI and PT (step S304).

Further, if the target language LT is not the typical language at step S301 (NO at step S301), the translation processing device 1 retrieves the pattern PCI of the typical language LCI of the original language category CI corresponding to the input sentence pattern PI based on the correspondence relationship information between the language patterns of the original language category CI (step S305).

The translation processing device 1 then retrieves the pattern PCT of the typical language LCT of the target language category CI corresponding to the pattern PCI based on the correspondence relationship information between the patterns of the typical languages (step S306). The translation processing device 1 further retrieves the output sentence pattern PT of the target language LT corresponding to the pattern PCT based on the correspondence relationship information between the language patterns of the target language category CT (step S307). Herein, the translation processing device 1 determines the correspondence relationship <SI,PT> between the input sentence SI and the output sentence pattern PT from the correspondence relationship <SI,PI> between the input sentence SI and the input sentence pattern PI, the correspondence relationship <PI,PCI> between PI and PCI, a correspondence relationship <PCI,PCT> between PCI and PCT, and the correspondence relationship <PCT,PT> between PCT and PT (step S308).

After step S304 or S308, the translation processing device 1 generates the translation sentence ST based on the correspondence relationship <SI,PT> between the input sentence SI and the output sentence pattern PT and the translation information of words and phrases of the original language LI and the target language LT (step S309), outputs the generated translation sentence ST (step S310), and completes the process.

DESCRIPTION OF SPECIFIC EXAMPLE

With reference to the diagrams illustrated in FIGS. 6A to 6E, a description will be given of an example in which the above-described flow is applied to a specific example. In the following example, description will be given of an example of a process of translating a Chinese input sentence into Japanese, wherein original language=Chinese, target language=Japanese, original language category=C1, target language category=C2, typical language of original language category C1=Chinese, and typical language of target language category C2=Korean.

The translation processing device 1 retrieves the input sentence pattern PI for the input sentence SI from a Chinese pattern DB. FIG. 6A illustrates the correspondence relationship between the input sentence SI and the input sentence pattern PI retrieved for the input sentence SI.

The translation processing device 1 then retrieves a pattern PK of Korean serving as the typical language of the target language category C2. FIG. 6B illustrates the correspondence relationship between the input sentence pattern PI and the pattern PK retrieved for the input sentence pattern PI.

The translation processing device 1 then retrieves the output sentence pattern PT of the target language corresponding to the pattern PK. FIG. 6C illustrates the correspondence relationship between the pattern PK and the output sentence pattern PT.

Further, FIG. 6D illustrates the correspondence relationship between the input sentence pattern PI and the output sentence pattern PT. Herein, Japanese translations of NPs (noun phrases) in the input sentence SI are acquired from a translation dictionary between Chinese and Japanese, and the translation sentence ST illustrated in FIG. 6E is ultimately obtained.

According to the above-described translation processing device 1, translation between multiple languages is possible with no need for holding the translation dictionary information for each of all language pairs or constructing an artificial language such as an intermediate language.

The present invention is not limited to the above-described exemplary embodiment. For example, in the above-described exemplary embodiment, the description has been given of an example of application of a pattern-based translation process of performing translation by using the correspondence relationship of sentence patterns between languages. The present invention, however, is also applicable to other translation processes, such as an analysis-based translation process of performing translation by using the result of a sentence analysis process (morphological analysis, syntactic analysis) and a statistics-based translation process of performing translation by using the result of statistically processing sentence elements.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A translation processing device comprising:
    a processor configured to execute:
        a setting unit that classifies a plurality of languages into a number of language categories and sets a typical language for each of the language categories;

an intra-category converting unit that performs, for each of the language categories, mutual conversion between a sentence described in a first language classified in a first language category and a sentence described in a first typical language of the first language category;

an inter-category converting unit that performs mutual conversion between a sentence described in the first typical language and a sentence described in a second typical language; and an acquiring unit that acquires information of an input sentence, the first language corresponding to a language of the input sentence, and a second language corresponding to a language into which the input sentence is translated, wherein, if the first language is not the first typical language, the intra-category converting unit converts the input sentence into a sentence described in the first typical language of the first language category to which the first language belongs, wherein, if the first language and the second language belong to different language categories, the inter-category converting unit converts the sentence converted by the intra-category converting unit into a sentence described in the second typical language of a second language category to which the second language belongs, and wherein, if the second language is not the second typical language, the intra-category converting unit further converts the sentence converted by the inter-category converting unit into a sentence described in the second language.

2. The translation processing device according to claim 1, further comprising:

an intra-category conversion information holding unit that holds, for each of the language categories, conversion information for performing mutual conversion between a sentence pattern described in the first language classified in the first language category and a sentence pattern described in the first typical language of the first language category;

an inter-category conversion information holding unit that holds conversion information for performing mutual conversion between a sentence pattern described in the first typical language and a sentence pattern described in the second typical language;

a first converting unit that converts, based on the conversion information held by the intra-category conversion information holding unit, a sentence pattern corresponding to the input sentence into a sentence pattern described in the first typical language of the first language category to which the first language belongs;

a second converting unit that converts, based on the conversion information held by the inter-category conversion information holding unit, the sentence pattern converted by the first converting unit into a sentence pattern described in the second typical language of the second language category to which the second language belongs;

a third converting unit that converts, based on the conversion information held by the intra-category conversion information holding unit, the sentence pattern converted by the second converting unit into a sentence pattern described in the second language; and a generating unit that generates a translation sentence of the input sentence by determining the sentence pattern converted by the second converting unit as an output sentence pattern if the second language is the typical language, or determining the sentence pattern converted by the third converting unit as an output sentence pattern if the second language is not the typical language, and converting a word or phrase of the input sentence corresponding to a variable portion of the output sentence pattern into a word or phrase of the second language.

3. A non-transitory computer readable recording medium storing a program causing a computer to execute a process for translation, the process comprising:

classifying a plurality of languages into a number of language categories and setting a typical language for each of the language categories;

performing, for each of the language categories, intra-category conversion between a sentence described in a first language classified in a first language category and a sentence described in a first typical language of the first language category;

performing inter-category conversion between a sentence described in the first typical language and a sentence described in a second typical language; and acquiring information of an input sentence, the first language corresponding to a language of the input sentence, and a second language corresponding to a language into which the input sentence is translated, wherein performing the intra-category conversion includes converting, if the first language is not the first typical language, the input sentence into a sentence described in the first typical language of the first language category to which the first language belongs, wherein performing the inter-category conversion includes converting, if the first language and the second language belong to different language categories, the sentence converted in the intra-category conversion into a sentence described in the second typical language of a second language category to which the second language belongs, and wherein performing the intra-category conversion includes further converting, if the second language is not the second typical language, the sentence converted in the inter-category conversion into a sentence described in the second language.

4. A translation processing method comprising:

classifying, by at least one processor, a plurality of languages into a number of language categories and setting a typical language for each of the language categories;

performing, by the at least one processor, for each of the language categories, intra-category conversion between a sentence described in a first language classified in a first language category and a sentence described in a first typical language of the first language category;

performing by the at least one processor, inter-category conversion between a sentence described in the first typical language and a sentence described in a second typical language; and acquiring by the at least one processor, information of an input sentence, the first language corresponding to a language of the input sentence, and a second language corresponding to a language into which the input sentence is translated, wherein performing the intra-category conversion includes converting, if the first language is not the first typical language, the input sentence into a sentence described in the first typical language of the first language category to which the first language belongs, wherein performing the inter-category conversion includes converting, if the first language and the second language belong to different categories, the sentence converted in the intra-category conversion into a sentence described in the second typical language of a second language category to which the second language belongs, and wherein performing the intra-category conversion includes further converting, if the second language is not the second typical language, the sentence converted in the inter-category conversion into a sentence described in the second language.

* * * * *